United States Patent [19]

Guitard et al.

[11] 4,139,215
[45] Feb. 13, 1979

[54] AUTOMOBILE SAFETY BELT

[76] Inventors: Laurent Guitard, Reilhaguet, 46200 Souillac; Georges Fenelon, Vielle Route de Paris, 46000 Cahors, both of France

[21] Appl. No.: 826,988

[22] Filed: Aug. 23, 1977

[51] Int. Cl.² ............................................. B60R 21/10
[52] U.S. Cl. .................................................. 280/744
[58] Field of Search ..................... 280/744, 745, 747; 297/389, 385, 388

[56] References Cited

U.S. PATENT DOCUMENTS 4,004,821 1/1977 Breitschwerdt et al. ............ 280/744

FOREIGN PATENT DOCUMENTS 2539819 10/1977 Fed. Rep. of Germany .......... 280/744

*Primary Examiner*—Joseph F. Peters, Jr.
*Assistant Examiner*—Norman L. Stack, Jr.
*Attorney, Agent, or Firm*—Shlesinger, Arkwright, Garvey & Dinsmore

[57] ABSTRACT

An automobile safety belt including means facilitating disengagement of the belt in an emergency by the wearer, another passenger or a rescuer and wherein the belt includes an auxiliary latch having a release strap so positioned as to be readily accessible while still permitting buckling and unbuckling of the belt in the conventional fashion.

10 Claims, 7 Drawing Figures

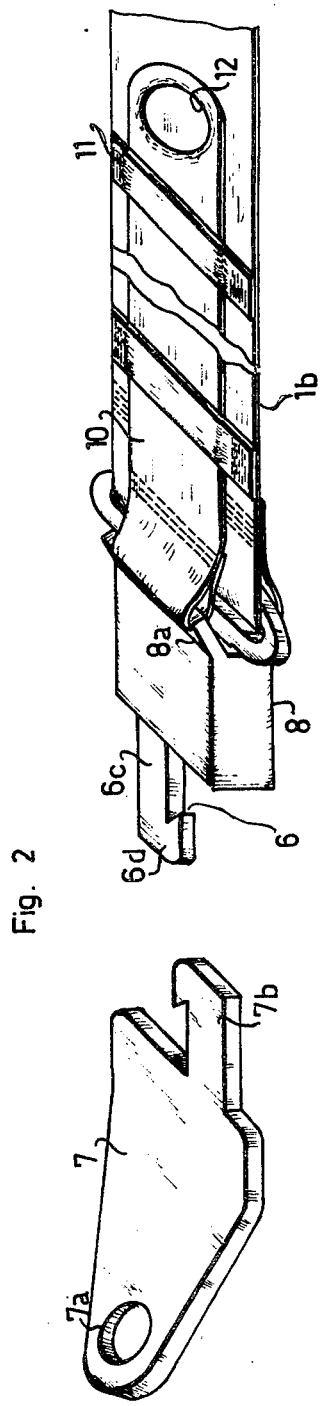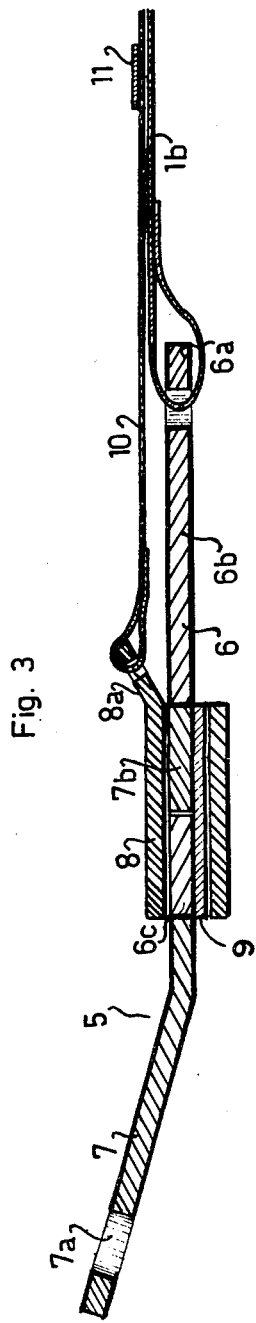

AUTOMOBILE SAFETY BELT

This invention relates to an automobile safety belt.

Safety belts are intended to hold the occupant of a vehicle in seated position for protection in case of accident. These belts must be able to be rapidly detached after the accident, either by the occupant or by another person, to prevent the occupant's being trapped in the vehicle, particularly in case of fire or sinking water. No safety belts known today entirely eliminate this risk, for many reasons: risk of defective function of the belt buckle after the collision, difficulty of maneuver of the buckle because of its position, difficulty of access to the buckle for another person coming to one's aid, etc. . . .

The present invention proposes overcoming the aforementioned inconveniences of known safety belts by furnishing a safety belt which can be released by the occupant in all cases and any position.

One particular object of the invention is to permit easy detachment of the belt after an accident or a collision, whatever be the position of the vehicle, either by the occupant himself or by another person.

Another object of the invention is to eliminate any risk of jamming or defective function of the belt after a collision.

Another object of the invention is to retain the traditional working process of the traditional belts, in normal situations, because users are accustomed to the traditional belts.

Another object of the invention is to furnish a safety belt of approximately the traditional cost, so that users will be inclined to use and benefit from the new belt.

The disclosed safety belt includes a belt which is adapted to hold an occupant in a vehicle, anchored at three points—one central and two lateral anchoring points—to hook said belt onto the vehicle, and a maneuverable attachment buckle of a standard type, situated adjacent to the central anchoring point to permit attachment and detachment of the belt in normal situations; this belt is comprised of the following, in combination with the aforementioned means:

an emergency buckle interposed between the belt and one of the lateral anchoring points, this emergency buckle including a first hooking element to which the belt is attached, a second hooking element, connected with the anchoring point and adapted to hook onto the first element and a movable blocking element on the first element and provided to have two positions, one blocking position wherein this movable element blocks the two hooking elements which are hooked into each other and one withdrawal position, wherein this movable element frees the second hooking element, a flexible traction control attached to the movable element of the emergency buckle to permit traction to be exerted on it, drawing it from its blocking position into its withdrawal position, and this flexible control fits alongside the belt along a predetermined distance and is bound to it by connection means which hold it along this belt and said flexible control is provided with gripping means at the other end from the emergency buckle.

Thus, in normal situation, the vehicle user attaches and detaches himself in the customary manner by maneuvering that buckle which is situated on one side of the central anchoring point. In case of collision or accident, particularly if this buckle is blocked or is found in a position where its movement becomes difficult, the user or a person coming to his aid can exert a rapid traction on the flexible control of the emergency buckle to displace the movable element therein in such a manner as to uncouple the hooking elements of the emergency buckle. The vehicle occupant is thus freed by one rapid and easy maneuver.

The flexible traction control can particularly be constituted of a flexible band superimposed onto the belt and of dimensions at the most equal to the dimensions of the belt, or else by a flexible cord running along the belt; the connection means hold this control and preferably are comprised of several keepers, distributed along the length of and attached to the belt.

The emergency buckle can be constituted of any buckle within the limitations of the above definition, in other words, having a movable blocking element which, by suitable exerted traction, has the capacity to free the hooking elements. This can particularly be a push-button type buckle, adapted to fix the flexible control behind its movable piece and adapted in inverted position relative to its customary position, to permit displacement of this movable piece by traction.

According to one feature of the invention, the emergency buckle is preferably constituted of a first hooking element formed of a plate having a free portion which extends from a portion having a hook-form cutout, and by a second hooking element formed of another plate having a hook-like cutout, which fits with the preceding, and by a movable blocking element comprising a sleeve adapted to slide around the first plate between a blocking position where it covers and surrounds the hooks of the two plates, and a withdrawal position where it is disposed around the free portion of the first plate and disengages the hooks. Magnetic means are preferably associated with this sliding sleeve to hold it stably in one or the other position.

Also, such a buckle is perfectly adapted to play the role of emergency buckle, because, having neither axle nor articulation nor spring, nor elements which must coincide, its function is not subject to any risk. Moreover, its very simple structure makes its manufacture less costly.

Other characteristics, objects and advantages of the invention are disclosed in the following description in reference to the attached drawings, which are of one nonlimiting embodiment of the invention.

FIG. 2 is a perspective view of the emergency buckle with which the belt is equipped, in detached position.

FIG. 3 is a longitudinal cross section of the buckle in attached position.

Figure 1:
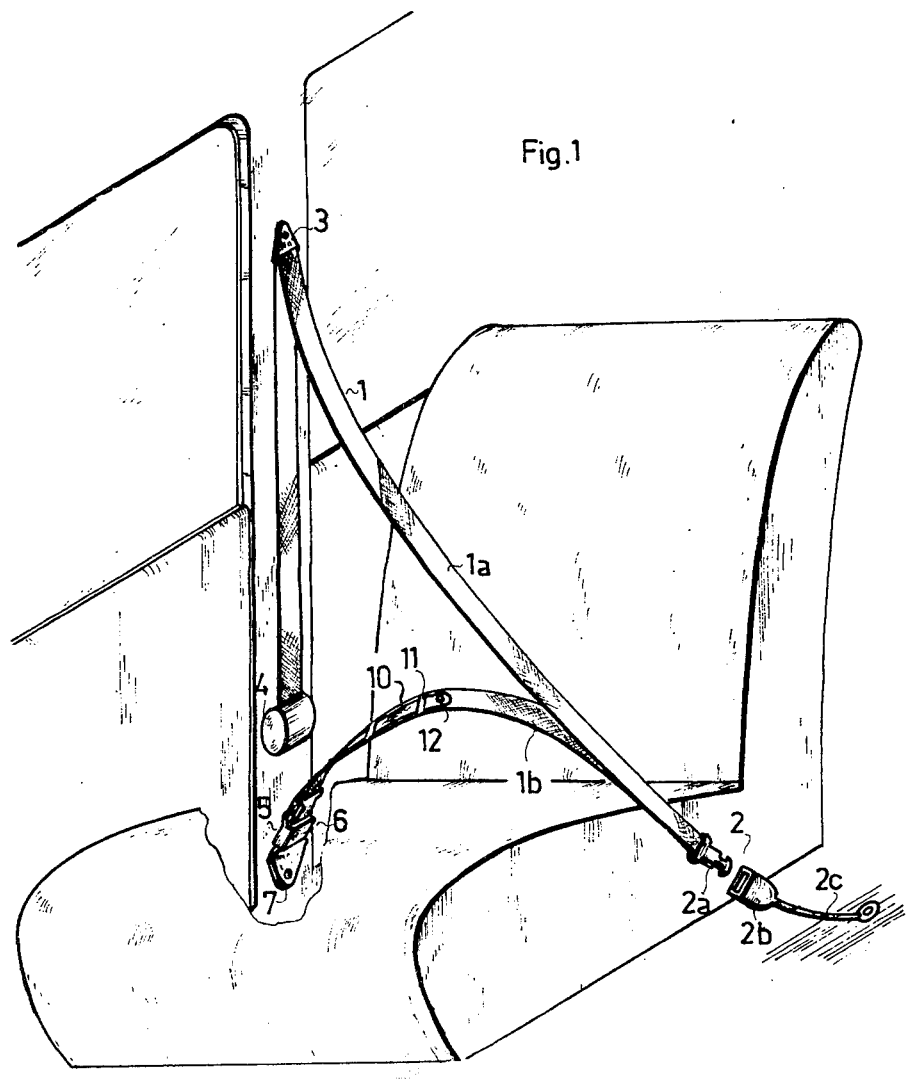
FIG. 1 is a view of a safety belt mounted on an automobile.

The safety belt shown as an example in FIGS. 1, 2, 3, 4 and 5 is comprised of a belt 1 of traditional type, subdividing into two strands 1a and 1b, the one intended to hold the occupant of the vehicle across the chest, the other holding across the hips.

In the center, this belt is maintained by a standard buckle 2, for example a push-button buckle, formed by a piece 2a provided with an oblong opening through which passes the belt, and a maneuverable hooking element 2b which is integral with a semi-rigid cable 2c, anchored on the floor of the vehicle between the two front seats.

In the example shown, on the lateral (door) side, strand 1a of the belt passes through a stirrup 3 attached on the upright pillar of the auto body and moves down toward an automatic winding device 4 which is affixed by its bottom part on this upright; this known type of device is provided with a stop means, adapted to hold the end of the belt by inertia.

Strand 1b of the belt is anchored on the bottom part of the frame pillar or on the floor of the vehicle by means of an emergency buckle 5.

This emergency buckle, as shown in detail in FIGS. 2 and 3, is very simply constituted of a first plate 6 to which is connected the end of strand 1b, a second plate 7 anchored on the vehicle frame upright or on the floor, and a movable sleeve 8.

Plate 6 includes an oblong opening 6a, in which is fixed belt 1, a free portion 6b of at least equal length to that of sleeve 8 and a portion 6c having a cutout in the form of a hook. In the example, this cutout comprises a hooking nose forming a return 6d approximately at 45° from the longitudinal axis of the plate.

A magnetic plate 9 adheres to plate 6 in the interior of sleeve 8.

Plate 7 includes a perforated portion 7a by which it is anchored on the vehicle door pillar or on its floor by bolting, and a portion 7b which has a cutout of hook form, fitting with that of the other plate.

Plates 6 and 7 are of ferromagnetic metal and the cross section of the hollow interior of sleeve 8 containing magnetic plate 9 is of a form adapted to fit with the form of plate 6. When the hooks of plates 6 and 7 cooperate with each other, this sleeve can slide between a blocking position where it covers and surrounds portions 6c and 7b of the plates and a withdrawn position where it disengages the hooks.

Magnetic plate 9 stabilizes sleeve 8 in each of its positions by magnetic attraction. This plate can be of magnetic material with nonsliding surface, to improve the stability of the sleeve.

Also, sleeve 8 is connected to a flexible control formed in the example by a flexible band 10 attached to said sleeve by a turned up edge 8a provided with an opening for attachment of the band. This band 10, smaller than the belt, is superimposed on said belt and is retained thereon by keepers 11, sewn on the belt.

Flexible band 10 runs along the belt for a suitable distance and is integral at its end with a gripping ring 12 by which it can be held and by which traction can be exerted on it. This ring can be a connected element or be formed from the belt itself, by an opening and suitable seams.

The length of band 10 is such that it exceeds the edge of the vehicle seat, so that ring 12 is situated laterally in approximately the first third of the breadth of the seat when the belt is in place.

Figure 4:
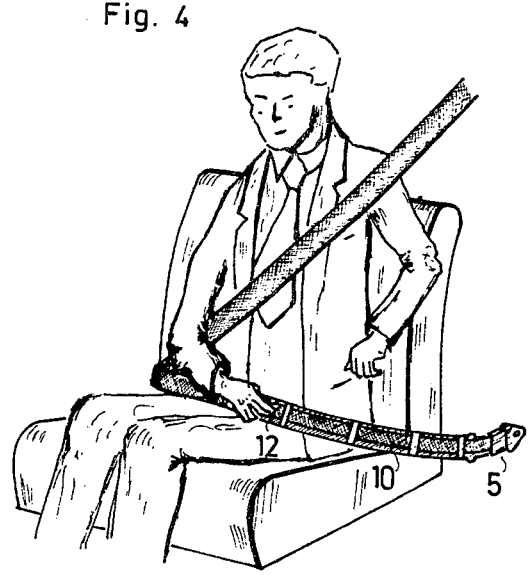
FIGS. 4 and 5 are diagrams of two uses of the belt after an accident.
Figure 5:
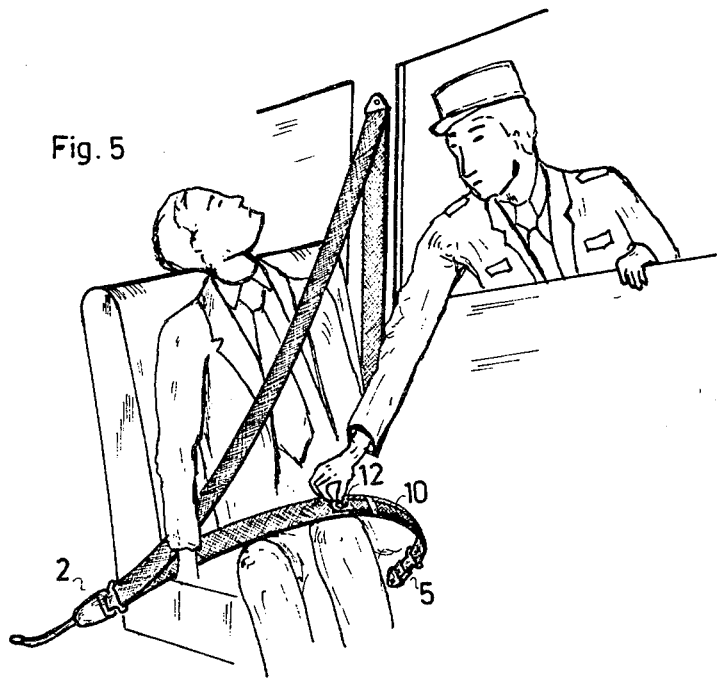

FIGS. 4 and 5 show that in case of need, ring 12 is of easy access for either the occupant or for a person coming to aid, and traction can be easily and rapidly exerted on it. This traction displaces sleeve 8 and draws it onto free portion 6b: the two hooks of plates 6 and 7 are no longer maintained and detach from each other immediately.

Emergency buckle 5 is intended to be used solely in exceptional situations: accident, collision or deficient function of standard buckle 2. In the normal situation, the user uses this standard buckle 2 for the attachment or detachment, and the emergency buckle remains constantly in hooked position.

It is to be noted that this emergency buckle is of no bother to the vehicle occupant, either for maneuver of the standard buckle or in consideration of the comfort of wearing the belt. Particularly, there is neither excessive thickness nor any rigid object applied against any part of the body of the occupant.

Figure 6:
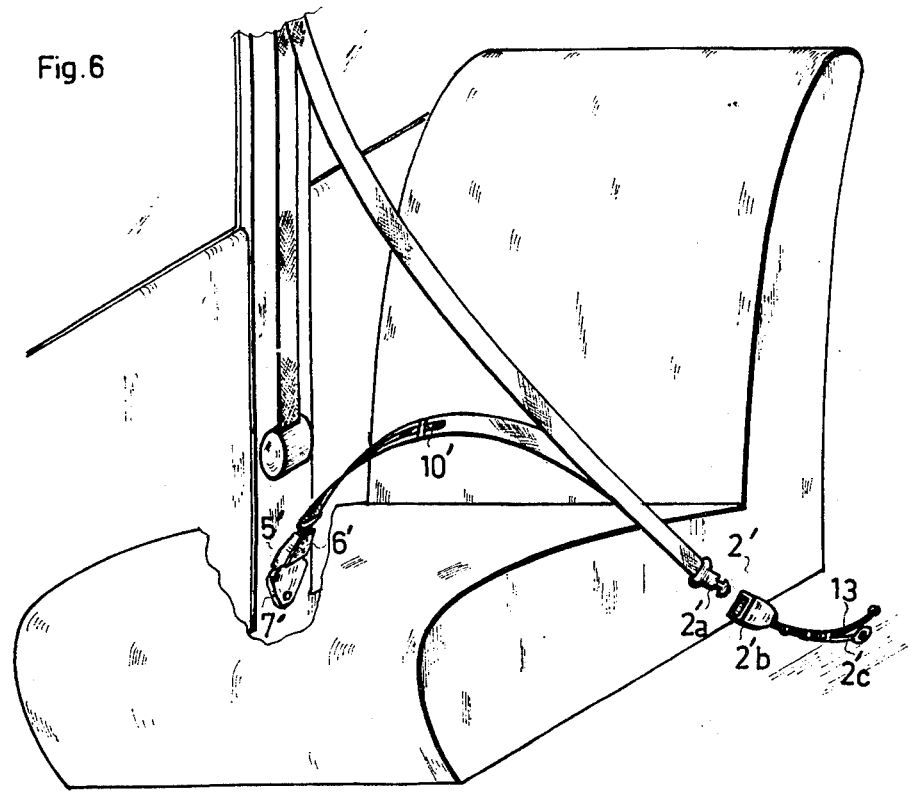
FIGS. 6 and 7 are diagrams of one variation of the invention.
Figure 7:
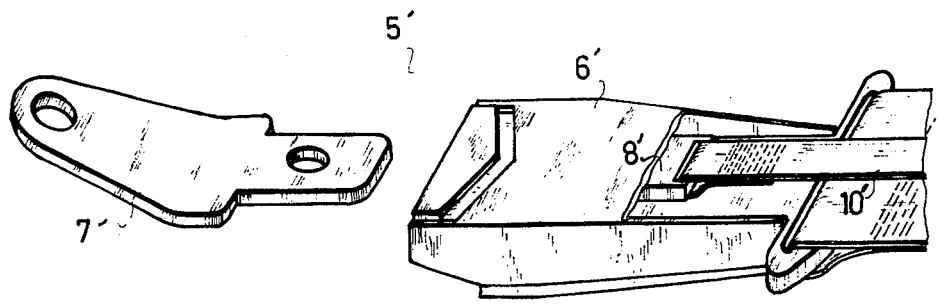

FIGS. 6 and 7 show a variation of the safety belt; in this variation, emergency buckle 5' constituted of a push-button type buckle, provided in reverse position, beside the side anchoring point; the second hooking element 7' of this buckle is connected to the anchoring point and the first element 6' is found opposite it. The flexible traction control 10' is attached to movable element 8' of said buckle, to permit maneuver by traction. Further details of the structure itself of this type are known.

Moreover, FIG. 6 shows a traction control, for example a narrow band 13, which can be associated with the central attachment buckle 2'. This control is arranged to the rear of this buckle 2' and, in the example, runs along the semi-rigid cable 2'c against which it is held by keepers; this control is connected to the movable blocking element of buckle 2' to permit its maneuver by traction exerted from points behind the vehicle by a rear passenger (less exposed than the occupants in front in case of accident). This arrangement furnishes another possibility of rapid release of the front seat occupants.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. Automobile safety belt to hold an occupant in seated position on the vehicle seat, and to permit safe release of the occupant in case of necessity, this belt comprised of a belt to hold the occupant, anchoring means at three points—one central anchoring point and two side anchoring points—to hook said belt on the vehicle, and a maneuverable attachment buckle situated beside the central anchoring point to allow for normal situation attachment and detachment of the belt, said safety belt being characterized by the following:

an emergency buckle interposed between the belt and one of the side anchoring points, this emergency buckle including a first hooking element to which the belt is attached, a second hooking element, connected to the anchoring point and adapted to be hooked into the first element, and a movable blocking element carried by the first element and provided to be used in two positions, one blocking position in which this element blocks the two hooked together hooking elements, and one withdrawn position in which this element frees the second hooking element, a flexible traction control on the movable element of the emergency buckle to permit traction to be exerted thereon, drawing it from its blocking position into its withdrawal position, said flexible control running along the belt by connection means which hold it along the belt, and said flexible control is provided at its end opposite the emergency buckle, with grip means provided for gripping and maneuvering the buckle.

2. Safety belt as in claim 1, wherein the flexible traction control comprises a flexible band superimposed on the belt and of at least equal width to that of the belt, and connection means holding this band and comprising several keepers distributed along the length of said band and affixed on the belt.

3. Safety belt as in one of the claim 2, wherein the grip means of the flexible control comprise a ring which is integral at its end opposite the emergency buckle.

4. Safety belt as in claim 1 in which one of the side anchoring points is situated at the bottom in the vicinity of the floor of the vehicle, wherein the emergency buckle is interposed between the belt and the aforementioned side anchoring point.

5. Safety belt as in claim 1, wherein the emergency buckle is constituted of a first hooking element formed of a plate having one portion free which extends into a part having a cutout of hook form, and a second hooking element formed of another plate having a cutout of hook form fitted with the preceding, and a movable blocking element comprising a sleeve which is adapted to slide around the first plate between a blocking position where it covers and surrounds the hooks of the two plates and a withdrawal position where it is arranged around the free portion of the first plate and disengages said hooks.

6. Safety belt as in claim 5, wherein the sliding sleeve is associated with magnetic means to hold it stably in one and the other of its positions.

7. Safety belt as in claim 6, wherein the magnetic means associated with the sleeve include a magnetic plate affixed on the first plate, and the sleeve is realized of ferromagnetic metal.

8. Safety belt as in claim 5, wherein the cutout in the form of a hook of each plate includes a hooking nose forming an approximately 45° return.

9. Safety belt as in claim 1, wherein the emergency buckle is a push-button type buckle, arranged in reverse position on the side of the side anchoring point, and the second hooking element of this buckle is connected to this anchoring point and the first element is arranged opposite it, and the flexible traction control is affixed at the rear of the movable element of said buckle.

10. Safety belt as in claim 1, wherein a traction control is associated with the attachment buckle situated at the side of the central anchoring point, and this control is arranged at the rear of this buckle to permit its maneuver from the rear seat of the vehicle.

* * * * *